2,819,317

POLYOLEFINIC ALCOHOLS OF INCREASED CONJUGATION FROM SOYBEAN AND MENHADEN OILS

Erle B. Ayres, Pittsburgh, Pa., assignor to Ethyl Corporation, New York, N. Y., a corporation of Delaware No Drawing. Application March 27, 1953
Serial No. 345,235

3 Claims. (Cl. 260—632)

This invention relates to the isomerization of high molecular weight unsaturated alcohols and is particularly concerned with a novel and improved process for the conjugation of polyunsaturated alcohols and the products obtained thereby.

High molecular weight alcohols, some of which are referred to as "fatty alcohols," have long been recognized as important chemical compounds, and their application in the fields of lubricant additives, detergents, drying oils, resins and the like, has been constantly increasing. In many applications it is desirable that the fatty alcohols employed contain a plurality of double bonds in the carbon chain and when used in the preparation of drying oils and various polymers and copolymers it has been recognized that the usefulness of the unsaturated alcohol can be enhanced if the double bonds present in the molecule are to a large extent conjugated. Heretofore, however, there has been no entirely satisfactory method for preparing these high molecular weight unsaturated alcohols which possess a conjugated system. For the most part the fatty alcohols are derived from naturally occurring fish, animal, and vegetable fats and oils by either hydrogenolysis or the conventional Bouveault-Blanc process wherein the oil or fat is reduced with an alkali metal to the alcoholate and subsequently hydrolyzed to form the alcohol. Although singly unsaturated alcohols can be produced by either process, the Bouveault-Blanc method must be used when multiple unsaturation is desired. For the most part the crude fats and oils which are highly unsaturated do not possess a conjugated system so that the resulting alcohol products are likewise conjugated only to a minor extent. It is known that by proper control of the reaction conditions some increase in the conjugation can be obtained when the alcohols are produced by the Bouveault-Blanc process. The conditions, however, are rather rigorous in that high temperatures and pressures are generally required. In addition, substantially stoichiometric quantities of the reducing agent are necessary. Even under these rather severe conditions the degree of increased conjugation in the final product generally is not high.

Another method for arriving at a conjugated system in an alcohol product is, in effect, isomerization of the double bonds in the fat or oil prior to conversion to the alcohols. Here again the process is unsatisfactory in that severe conditions of pressure and temperature must be employed and there is virtually no control of the isomerization which takes place.

As a result of my work in this field, however, I have discovered a novel and relatively simple process whereby the degree of conjugation present in unsaturated fatty alcohols can be enhanced to a considerable extent. Although the process of the present invention is applicable to increasing the conjugation of any polyunsaturated fatty alcohol, it finds particular application with regard to alcohols prepared by the Bouveault-Blanc process.

It is, therefore, an object of the present invention to overcome the above disadvantages of the prior art and provide a new and improved process for enhancing the degree of conjugation of the poly-unsaturated alcohols. It is a further object of the present invention to provide a more economical and convenient procedure for preparing these useful conjugated unsaturated alcohols than heretofore known. A still further object is to provide a novel class of poly-unsaturated high-molecular-weight alcohols characterized by possessing a high degree of conjugation. These and other objects of the present invention will become apparent from the discussion hereinafter.

The above and other objects of this invention are accomplished by reacting unsaturated alcohols directly with alkali metal-containing materials, that is the alkali metals and alkali metal-containing compounds, under moderate operating conditions. To the best of my knowledge the direct isomerization of the polyunsaturated alcohols obtained from fish, animal and vegetable oils has not been investigated heretofore.

As stated hereinbefore the isomerization of polyunsaturated high molecular weight alcohols has been obtained by the reduction of naturally occurring oils by utilizing high temperatures, high pressures and substantially stoichiometric quantities of the reducing agent. Surprisingly, I have now found that I can isomerize the polyolefinic alcohols to a highly conjugated system utilizing only catalytic quantities of the alkali metals or alkali metal-containing compounds and employing mild conditions of temperature and pressure. In general, I prefer to use quantities of the alkali metal or alkali metal-containing compounds equivalent to less than 10 percent by weight of the alcohol which is to be isomerized.

As mentioned above the previous procedures involving the reduction of the crude fish, animal and vegetable oils and their concurrent isomerization have required relatively high temperatures. In carrying out the process of this invention I have found that I can isomerize the unsaturated alcohols to highly conjugated systems by reacting them directly with alkali metal or alkali metal-containing compounds at comparatively moderate temperatures. The temperature employed in carrying out the proccess of this invention will depend upon the particular starting materials. However, it has been discovered that the unsaturated high molecular weight alcohols can isomerize at temperatures not above the reflux temperature of the reaction mixture. In general, it is preferred to use temperatures below 250° C.

I have also discovered that the isomerization of poly-unsaturated high molecular weight alcohols can be accomplished at atmospheric pressure and does not require the use of pressure equipment as has heretofore been utilized in obtaining the conjugated product.

As stated hereinbefore the high molecular weight alcohols which can be employed in carrying out the process of this invention are generally obtained from the various fish, animal and vegetable oils. These materials can be produced by known methods from the crude oils and are readily available. The alcohols obtainable from these naturally occurring oils comprise mixtures of saturated and unsaturated alcohols, the substantial portion being the polyolefinic alcohols containing between about 15 and 30 carbon atoms. However, it is not intended that this invention be limited to those alcohols or mixtures of alcohols which contain the aforementioned number of carbon atoms but that this process shall be applicable to any poly-olefinic alcohol containing at least 8 carbon atoms.

The process of this invention is conducted by reacting the aforementioned alcohols with materials selected from the group consisting of the alkali metals and the alkali metal-containing compounds. The term alkali metal is intended to include the metals sodium, potassium, lithium, rubidium and cesium.

When the process of this invention is carried out in the presence of alkali metal-containing compounds these compounds may be both the inorganic and organic compounds of the aforementioned alkali metals. Thus, when the inorganic alkali metal-containing compounds are employed, these compounds can be the various inorganic salts and bases of these elements. In general, it is preferred to employ the hydroxides of the alkali metals, namely sodium hydroxide, potassium hydroxide, lithium hydroxide, rubidium hydroxide, and cesium hydroxide. Alternately the amides, carbonates, oxides and the like inorganic compounds of the alkali metals may also be employed.

When the process of this invention is conducted by reacting the alcohols in the presence of catalytic quantities of the alkali metal-containing organic compounds, I have found that I can use the various alcoholates of the alkali metals, that is, the alcoholates obtainable when reacting the alkali metals with the various aliphatic, alicyclic, and aromatic alcohols. Thus, I can employ the alcoholates obtainable by reacting the alkali metals with the aliphatic alcohols such as, for example, the saturated aliphatic alcohols: methyl, ethyl, n-propyl, n-butyl, isobutyl and the like up to and including those containing about 18 carbon atoms and their various branched chain and positional isomers. Similarly I can employ the alcoholates which are produced by reacting the alkali metals with unsaturated alcohols such as allyl and oleyl alcohol. In addition I can also employ the alcoholates which are formed when reacting the alkali metals with aromatic alcohols such as, for example, benzyl alcohol, β-phenyl ethyl alcohol, γ-phenyl-n-propyl alcohol, o-tolyl carbinol and the like. Other alcoholates which can be used in carrying out the process of this invention are those derived from the various secondary, tertiary, and polyhydric alcohols and also the ether alcohols. The foregoing examples are cited merely for illustrative purposes and it is not intended that this invention be restricted to their use only. These and other examples will become apparent to those experienced in the art.

It is not imperative that the alcoholates be prepared prior to their incorporation into the reaction mixture. In fact, the alcoholates can be prepared in situ and generally this procedure is preferred since the cost of operation is thereby lessened. Further, although the examples cited are of the batch-type operations, this process is also adaptable to continuous operation.

Although not required in all instances I have found that the process of this invention can be carried out with greater facility in the presence of certain organic diluents such as, for example, the hydrocarbons, ethers or alcohols. Depending upon the particular reactants involved, the reaction mixture may be very viscous. Therefore, to facilitate agitation of the mixture and more efficient reaction, one can employ solvents such as, for example, the alicyclic hydrocarbons, butane, pentane, hexane, and the like up to and including those containing about 20 carbon atoms and their various positional and branched chain isomers. Similarly other hydrocarbons can be employed such as the alkenes: the various pentenes, hexenes, heptenes, octenes and the like up to and including those containing about 18 carbon atoms and their various isomers; the cyclic hydrocarbons, such as, for example, cyclopentane, cyclohexane, methyl cyclohexane, ethyl cyclohexane, and the like and their various positional isomers; and the aromatic hydrocarbons such as, for example, benzene, toluene, xylene and the like.

When the ethers are employed as a solvent they can be the monoethers such as, for example, diethyl ether, di-n-propyl ether, diisopropyl ether, diisobutyl ether and the like and their various positional and branch chain isomers or they can be unsymmetrical ethers such as, for example, methyl ethyl ether, methyl-n-propyl ether, methyl isopropyl ether, ethyl-n-propyl ether, ethyl isopropyl ether, n-propyl isopropyl ether, n-propyl-n-butyl ether, sec.-butyl methyl ether, ter.-butyl methyl ether and the like or they can be alkyl aryl ethers such as, for example, methyl phenyl ether, methyl-o-tolyl ether, ethyl phenyl ether, ethyl-o-tolyl ether, n-propyl phenyl ether and the like or they can be alkaryl alkyl ethers such as for example, benzyl ether, benzyl ethyl ether and the like. Further the polyethers can be employed such as those derived from the various glycols. Among the alcohols which can be employed are intended those which have been mentioned previously and others, and in general the alcohols are preferred in that the alcoholates can be prepared in situ.

It is preferred to employ those solvents which are ordinarily liquids at room temperature and preferably those boiling between about 140 and 250° C. These solvents are particularly advantageous in that the reaction can be carried out at the reflux temperature without resorting to a pressure operation and further the solvents are easily removed from the product by distillation.

Typical examples for carrying out the process of the present invention are as follows, wherein all parts or percentages are by weight unless otherwise stated.

EXAMPLE I

The starting material employed in this run is a mixture of poly-olefinic alcohols derived from a crude menhaden oil, the analysis of this material being: percent hydroxyl, 6.32, acid number of 1.9, Klee and Benham iodine number (J. Am. Chem. Soc. 27 130 (1950)) of 187, and the ordinary Wijs iodine number of 182. This mixture of alcohols also contained a minor proportion of water. To an agitated mixture of 54.2 parts of the aforementioned alcohols in about 175 parts of xylene was added 0.81 part of caustic soda. The reaction mixture was then blanketed by a nitrogen atmosphere and heated to the reflux temperature and refluxed for a period of about 18 hours. The reaction mixture was then neutralized with dilute acid and the product removed from the solution by stripping over a period of about 5.5 hours to 25 mm. of mercury final pressure and 170° C. final jacket temperature. The product weighed 51.0 parts and had a percent hydroxyl of 6.16, an acid number of 3.7, Klee and Benham iodine number of 192 and the ordinary Wijs iodine number of 126. The minimum percent conjugation was determined by the formula $$\text{Minimum percent conjugation} = \frac{2(A-B)}{A} \times 100$$

where A is the Klee-Benham iodine number and B is the Wijs iodine number. The minimum percent conjugation of the product was thus found to be 68 percent as compared with 7 percent in the starting material.

EXAMPLE II

To 106 parts of fish oil alcohols of essentially the same analysis as those in Example I was added 0.82 part of sodium. The reaction mixture was then blanketed with nitrogen, agitated and heated to a temperature of between about 141 and 152° C. The mixture was maintained at this temperature for a period of 16 hours at which time it was allowed to cool to room temperature. The resulting solution was neutralized with dilute sulfuric acid producing an emulsification. This emulsification was broken up by adding about 174 parts of toluene, the product was then washed with water and dried and subsequently stripped over a period of 4½ hours to 25 mm. of mercury final pressure and 152° C. final jacket temperature. Ninety-eight and eight tenths parts of product were obtained having a percent hydroxyl of 6.33, acid number of 3.6, Klee-Benham iodine number of 183 and a Wijs iodine number of 129. Thus the minimum percent conjugation was found to be 59 percent as compared with 7 percent in starting material.

EXAMPLE III

The alcohols to be isomerized were soy bean alcohols having an analysis of: percent hydroxyl, 6.31, acid number 3.4, Klee and Benham iodine number 155 and the Wijs iodine number of 155. To an agitated mixture of 56.1 parts of the soy bean alcohols dissolved in about 176 parts of xylene was added 0.80 part of caustic soda. The reaction mixture was maintained in a nitrogen atmosphere, heated to the reflux temperature and maintained at this temperature for a period of about 18 hours. At the end of this time the mixture was neutralized with dilute acid and the product was stripped for about 4 hours to 11 mm. of mercury final pressure and 155° C. final jacket temperature. The resulting product weighing 53.7 parts had a percent hydroxyl of 6.23, an acid number of 5.8, the Klee and Benham iodine number of 169 and the Wijs iodine number of 137. Thus the minimum percent conjugation was 38 percent as compared with 0 percent in the starting materials.

Further examples are presented below in which the process was conducted essentially the same as presented above and wherein the particular solvents, reactants and various analysis are presented in tabular form.

| Starting Materials | Percent Hydroxyl | Acid No. | Iodine Number A | Iodine Number B | Minimum Percent Conjugation |
|---|---|---|---|---|---|
| Unsat. Alcohol No. 1: Fish Oil Alcohols (from a crude Menhaden Oil) | 6.42 | 0.0 | 191 | 183 | 8 |
| Unsat. Alcohol No. 2: Fish Oil Alcohols (from a crude Menhaden Oil) | 6.32 | 1.9 | 187 | 182 | 7 |

NOTES.—Hydroxyl values are weight percent hydroxyl, corrected for the acid content of the samples. Iodine numbers were determined by the Klee and Benham (60 minute) and by the ordinary Wijs (30 minute) procedures and are tabulated above under A and B respectively.

Similarly, the poly-olefinic high molecular weight alcohols can be isomerized in the presence of catalysts other than caustic soda or sodium as presented in the foregoing examples. For example, the unsaturated alcohols can be isomerized when reacting them with catalytic quantities of the other alkali metals or their hydroxides such as, for example, the alkali metals, lithium, potassium, rubidium and cesium or their hydroxides. In addition, the unsaturated alcohols can be isomerized by reacting them with catalytic quantities of the salts of these alkali metals such as, for example, the amides, carbonates, sulfides and the like. Moreover, the poly-olefinic alcohols can be isomerized to a higher degree of conjugation when reacting them with catalytic quantities of the alcoholates of the various alkali metals. These alcoholates may be prepared prior to introduction to the reaction mixture or they may be prepared in situ as, for example, reacting the soy bean alcohols with sodium, potassium, lithium, rubidium or cesium alcoholates or merely adding the alkali metals to a mixture of the high molecular weight alcohols and a suitable low molecular weight alcohol whereby the particular alkali metal will react with the low molecular weight alcohol to form the alkali metal alcoholate. Another embodiment of this invention is that the alkali metals can be introduced to the reaction mixture in the form of a dispersion. That is, the alkali metal is dispersed in an organic liquid or mixture such as, for example, benzene, toluene, heavy alkylate, and the like.

As mentioned above, the minimum percent conjugation was obtained by the formula:

$$\text{Minimum percent conjugation} = \frac{2(A-B)}{A} \times 100$$

where A is the Klee-Benham (60 minute) iodine number and B is the ordinary Wijs (30 minute) iodine number. The assumptions involved are that (a) the Klee-Benham iodine number measures ethylenic unsaturation, (b) that

| Unsat. Alcohol No. | 1 | 2 | 2 | | 2 | | 2 | | 2 | | 2 |
|---|---|---|---|---|---|---|---|---|---|---|---|
| Wgt., grs. | 75.6 | 59.4 | 75.0 | | 79.4 | | 75.9 | | | | 115.1 |
| Diluents Solvent | Toluene (200 ml.) | Toluene (200 ml.) | Toluene (300 ml.) | | Xylene (300 ml.) | | 4-Methyl-2-pentanol (300 ml.) | | | | |
| Lower Alcohol | | Methanol (11 ml.) | 4-Me-2-pentanol (3.9 ml.) | | | | Solvent | | | | |
| Catalyst Name | Na | Na | 50% Na disper. | | Na | | Na | | | | Na |
| Wgt., grs. | 0.63 | 0.45 | 1.4 | | 0.78 | | 0.76 | | | | 0.90 |
| | | | $x^*$ | $y^*$ | $x^*$ | $y^*$ | $x^*$ | $y^*$ | | | |
| Time of Reaction, Hours | 28.5 | 15.2 | 2.1 | 17.0 | 4.0 | 19.0 | 1.0 | 18.7 | | | 16.0 |
| Temperature | Refl. | Refl. | Refl. | Refl. | Refl. | Refl. | Refl. | Refl. | | | 143–145° C. |
| Product Wgt., grs. | 75.0 | 58.3 | 32.1 | 39.0 | 32.9 | 34.0 | 34.0 | 40.5 | | | 106.8 |
| Percent Hydroxyl | 6.38 | 6.43 | 6.49 | 6.41 | 6.48 | 6.27 | 6.82 | 6.62 | | | 6.22 |
| Acid Number | | 3.5 | 3.3 | 2.7 | 2.5 | 2.4 | 3.3 | 3.4 | | | 3.6 |
| Iodine No.: A | 191 | 190 | 192 | 191 | 185 | 179 | 189 | 190 | | | 186 |
| B | 147 | 175 | 182 | 167 | 151 | 125 | 166 | 133 | | | 135 |
| Minimum Percent Conjugation: $\frac{200(A-B)}{A}$ | 47 | 15 | 10 | 26 | 36 | 61 | 24 | 60 | | | 55 |

*Part of the mixture was removed at the time shown below "$x$" and the remainder left for the total time shown below "$y$."

in the Wijs determination halogen adds to all isolated double bonds and to all but one double bond of any conjugated system, and (c) that 2 is the minimum number of double bonds in the conjugated system. The minimum percent conjugation is thus the basis for rough comparison only inasmuch as it is known that halogen continues to add slowly to the final double bond of the conjugated systems and also only the first pair of bonds in the system is measured; that is, shifting of more double bonds into a conjugated system could not be determined by this pair of measurements. Nevertheless, in order to test the reliability of determining the minimum percent conjugation by this method, the results obtained on testing two samples of menhaden alcohols were compared with results obtained by conventional ultraviolet absorption spectra. The comparison is shown in the following table:

*Calculated conjugated unsaturation in menhaden alcohols from ultraviolet absorption spectra and from iodine number differences*

| Alcohols | Number of Double Bonds | Ultraviolet Wt. Percent Alcohols with Conjugated Bonds | | Calculated Minimum Percent Conjugation | |
|---|---|---|---|---|---|
| | | Before | After | Before | After |
| Fish oil Alcohols (from high fraction menhaden oil) | 2 | 12.8 | 29.6 | | |
| | 3 | 4.3 | 7.3 | | |
| | 4 | 0.5 | 1.8 | | |
| Totals | | 17.6 | 38.7 | 26 | 62 |
| Fish oil Alcohols (from a crude menhaden oil) | 2 | 4.5 | 22.0 | | |
| | 3 | 0.8 | 18.6 | | |
| | 4 | 0.07 | 3.8 | | |
| Totals | | 5.37 | 44.4 | 8 | 47 |

Thus it can be seen that by either method of determination it was found that in the first sample approximately a two-fold increase in conjugated unsaturation is obtained and for the second sample a six to eight-fold increase is obtained.

The process of this invention shall find particular utility in the production of highly-conjugated unsaturated alcohols for use as drying materials in the coatings industry. Further, they can also be used as intermediates in the production of polymers or for producing detergents in the soap industry. They can also be used as intermediates for the production of esters of dibasic acids such as, for example, adipic, azeleic and the like acids. These and other uses will become apparent to those skilled in the art.

Having thus described the novel process of this invention it is intended that it shall not be limited except as expressed in the appended claims.

I claim:
1. Mixtures of polyolefinic alcohols corresponding in carbon chain and in degree of unsaturation with the fatty acid radicals of soy bean oil, and prepared by the reduction of soy bean oil, the alcohols having been isomerized to at least a 38% minimum conjugation of the olefinic groups in said radicals.

2. Mixtures of polyolefinic alcohols corresponding in carbon chain and in degree of unsaturation with the fatty acid radicals of menhaden oil, and prepared by the reduction of menhaden oil, the alcohols having been isomerized to at least double the minimum conjugation of the olefinic groups in said radicals.

3. Mixtures of polyolefinic alcohols corresponding in carbon chain and in degree of unsaturation with fatty acid radicals selected from the class consisting of soy bean oil acid radicals and menhaden oil acid radicals, and prepared by the reduction of the corresponding oils, the alcohols having been isomerized to at least 38% minimum conjugation of the olefinic groups in the corresponding radicals.

References Cited in the file of this patent

UNITED STATES PATENTS

| | | |
|---|---|---|
| 2,242,230 | Burr | May 20, 1941 |
| 2,265,211 | Waibel et al. | Dec. 9, 1941 |
| 2,340,691 | Richardson | Feb. 1, 1944 |
| 2,343,644 | Cawley | Mar. 7, 1944 |
| 2,429,411 | Jones et al. | Oct. 21, 1947 |
| 2,587,457 | Freed | Feb. 26, 1952 |

OTHER REFERENCES

Kass et al.: J. A. C. S., vol. 61 (1939), pp. 482–3.
Ligthelm: J. Chem. Soc. (London), 1950, pp. 3187–90 and 45 C. D. 6151i.